(12) United States Patent
Kim

(10) Patent No.: US 12,642,624 B2
(45) Date of Patent: Jun. 2, 2026

(54) IMAGE PROCESSING METHOD FOR DESIGNING SMILE LINE AND DEVICE USING THE SAME

(71) Applicant: MEDIT CORP., Seoul (KR)

(72) Inventor: Sang Hun Kim, Seoul (KR)

(73) Assignee: MEDIT CORP., Seoul (KR)

( * ) Notice: Subject to any disclaimer, the term of this patent is extended or adjusted under 35 U.S.C. 154(b) by 428 days.

(21) Appl. No.: 18/034,138

(22) PCT Filed: Oct. 26, 2021

(86) PCT No.: PCT/KR2021/015098
§ 371 (c)(1),
(2) Date: Apr. 27, 2023

(87) PCT Pub. No.: WO2022/092763
PCT Pub. Date: May 5, 2022

(65) Prior Publication Data
US 2023/0380934 A1 Nov. 30, 2023

(30) Foreign Application Priority Data

Oct. 29, 2020 (KR) ........................ 10-2020-0142089
Dec. 18, 2020 (KR) ........................ 10-2020-0178225

(51) Int. Cl.
*A61C 7/00* (2006.01)
*A61C 19/04* (2006.01)
(Continued)

(52) U.S. Cl.
CPC .............. *A61C 7/002* (2013.01); *A61C 19/04* (2013.01); *G06T 3/40* (2013.01); *G06T 3/60* (2013.01);
(Continued)

(58) Field of Classification Search
CPC ........... A61C 7/002; A61C 19/04; G06T 3/40; G06T 3/60; G06T 5/50;
(Continued)

(56) References Cited

U.S. PATENT DOCUMENTS

2005/0271996 A1* 12/2005 Sporbert .................. A61C 7/00
433/24
2007/0054231 A1* 3/2007 Manemann ............ G16H 20/40
433/24
(Continued)

FOREIGN PATENT DOCUMENTS

ES 2877219 T3 * 11/2021
JP 2018-534050 A 11/2018
(Continued)

OTHER PUBLICATIONS

Extended European Search Report issued Sep. 9, 2024 in Application No. 21886757.0.
(Continued)

*Primary Examiner* — Edward Park
*Assistant Examiner* — Alexander Joseph Vaugh
(74) *Attorney, Agent, or Firm* — Sughrue Mion, PLLC

(57) ABSTRACT

An image processing method according to the present disclosure includes the steps of: receiving at least one image data; assigning a plurality of feature points to the at least one image data; fitting the at least one image data to have at least one of a predetermined size and a predetermined angle based on at least one feature line generated by connecting at least two of the feature points; and designing a smile line by applying at least one template to a feature region generated by the feature points of the fitted image data.

12 Claims, 12 Drawing Sheets

(51) Int. Cl.
| | |
|---|---|
| *G06T 3/40* | (2006.01) |
| *G06T 3/60* | (2006.01) |
| *G06T 5/50* | (2006.01) |
| *G06V 10/44* | (2022.01) |
| *G06V 10/75* | (2022.01) |

(52) U.S. Cl.
CPC ................ *G06T 5/50* (2013.01); *G06V 10/44* (2022.01); *G06V 10/751* (2022.01); *G06T 2207/20221* (2013.01)

(58) Field of Classification Search
CPC . G06T 2207/20221; G06T 2207/10024; G06T 2207/30036; G06T 7/73; G06V 10/44; G06V 10/751; A61B 5/0088; A61B 5/107; A61B 34/10
See application file for complete search history.

(56) References Cited

U.S. PATENT DOCUMENTS

| | | |
|---|---|---|
| 2013/0158958 A1 | 6/2013 | Methot |
| 2013/0218530 A1 | 8/2013 | Deichmann et al. |
| 2018/0235729 A1 | 8/2018 | Kim et al. |
| 2018/0249912 A1 | 9/2018 | Schneider et al. |
| 2018/0263731 A1* | 9/2018 | Pokotilov .............. G16H 20/40 |
| 2020/0143541 A1 | 5/2020 | Wang et al. |

FOREIGN PATENT DOCUMENTS

| | | |
|---|---|---|
| KR | 10-2015-0039028 A | 4/2015 |
| KR | 10-1799878 B1 | 11/2017 |
| KR | 10-1978559 B1 | 5/2019 |
| KR | 10-2083619 B1 | 3/2020 |
| WO | 2018/175486 A1 | 9/2018 |

OTHER PUBLICATIONS

International Search Report for PCT/KR2021/015098 dated Jan. 28, 2022.

Korean Office Action dated Jun. 16, 2022 in Application No. 10-2020-0178225.

Notice of Final Rejection dated Dec. 9, 2022 in Application No. 10-2020-0178225.

\* cited by examiner

FIG. 1

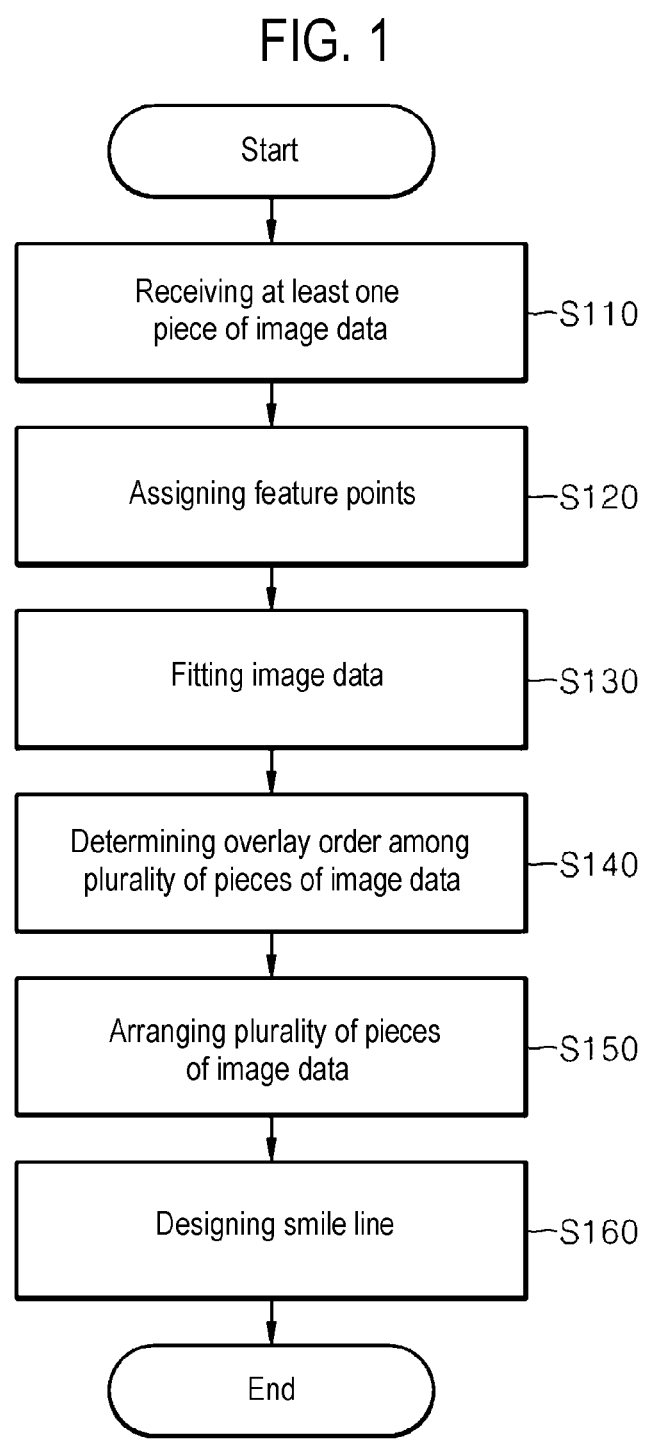

```
          ┌─────────────┐
          │    Start     │
          └─────────────┘
                 │
                 ▼
   ┌──────────────────────────┐
   │   Receiving at least one  │ ─── S110
   │     piece of image data   │
   └──────────────────────────┘
                 │
                 ▼
   ┌──────────────────────────┐
   │  Assigning feature points │ ─── S120
   └──────────────────────────┘
                 │
                 ▼
   ┌──────────────────────────┐
   │     Fitting image data    │ ─── S130
   └──────────────────────────┘
                 │
                 ▼
   ┌──────────────────────────┐
   │ Determining overlay order │ ─── S140
   │ among plurality of pieces │
   │        of image data      │
   └──────────────────────────┘
                 │
                 ▼
   ┌──────────────────────────┐
   │   Arranging plurality of  │ ─── S150
   │   pieces of image data    │
   └──────────────────────────┘
                 │
                 ▼
   ┌──────────────────────────┐
   │    Designing smile line   │ ─── S160
   └──────────────────────────┘
                 │
                 ▼
          ┌─────────────┐
          │     End      │
          └─────────────┘
```

Figure 12:
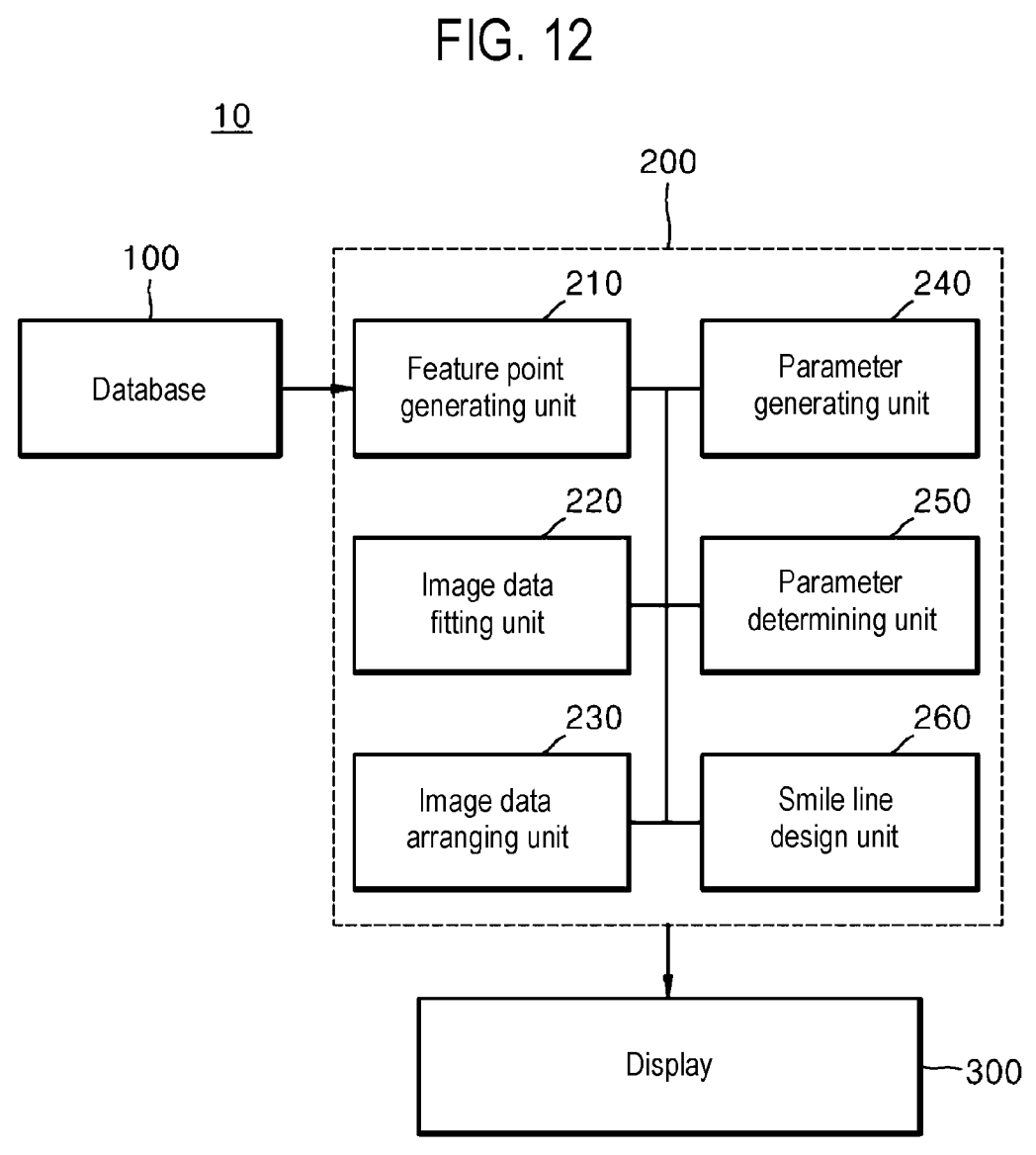

Database

Feature point
generating unit

Parameter
generating unit

220

250

Image data
fitting unit

Parameter
determining unit

230

260

Image data
arranging unit

Smile line
design unit

Display

300

IMAGE PROCESSING METHOD FOR DESIGNING SMILE LINE AND DEVICE USING THE SAME

CROSS REFERENCE TO RELATED APPLICATIONS

This application is a National Stage of International Application No. PCT/KR2021/015098 filed Oct. 26, 2021, claiming priority based on Korean Patent Application No. 10-2020-0142089 filed Oct. 29, 2020 and Korean Patent Application No. 10-2020-0178225 filed Dec. 18, 2020, the entire disclosures of which are incorporated herein by reference.

TECHNICAL FIELD

The present disclosure relates to an image processing method and a device using thereof.

BACKGROUND

A smile line is made according to tooth lines, tooth shapes, a degree of exposure of gums when smiling, gum lines, a length and thickness of lips, a length of the philtrum, and a degree and direction of activation of muscles around the lips and muscles associated therewith. A patient may have a desired smile line through a corrective treatment. Particularly, a patient who considers a treatment such as a veneer or a laminate is curious about how the patient's face (more specifically, the smile line) will be changed by the treatment. The smile line varies according to a person's facial appearance, and shaping of the smile line through a corrective treatment or operation is also referred to as smile design.

Meanwhile, a patient may acquire a desired smile line through smile design. The patient may wear a corrective object to acquire the smile line. There have been increasing demands for a method and a device for acquiring the smile line in a precise and quick manner, thereby improving user convenience and providing a corrective treatment plan quickly.

SUMMARY

In order to solve the above-mentioned problems, the present disclosure provides an image processing method wherein at least one piece of image data is received as an input and is fitted so as to have at least one of a desired size or a desired angle such that a template for correction is applied to a specific region of the fitted image data, thereby designing a smile line.

In addition, the present disclosure provides an image processing method wherein a plurality of pieces of image data having different degrees of openness are compared such that a rank of open image data and normal image data is determined, and the plurality of pieces of image data are arranged according to the determined rank.

In addition, the present disclosure provides an image processing device wherein an image data fitting unit is used to fit image data, and a template is applied to the image data, thereby designing a smile line.

In addition, the present disclosure provides an image processing device wherein a plurality of pieces of image data different in terms of the degree of openness are received as an input, and at least one of the size or angle between the plurality of pieces of image data is matched, thereby arranging the plurality of pieces of image data based on a parameter indicating a degree of openness.

Technical problems to be solved by the present disclosure are not limited to the above-mentioned technical problems, and other technical problems not mentioned herein will be clearly understood from the following descriptions by those skilled in the art.

An image processing method according to the present disclosure may include a step of receiving at least one piece of image data as an input, a step of assigning at least one feature point onto the at least one piece of image data, a step of fitting the at least one piece of image data so as to have at least one of a predetermined size or a predetermined angle based on the feature point, and a step of designing a smile line by applying at least one template to a feature region of the image data based on the feature point. Accordingly, image data may be easily fitted according to a specification, and a template may then be applied.

In addition, in the image processing method according to the present disclosure, a plurality of pieces of image data having different degrees of openness may be received as an input, at least one of the size or angle between the plurality of pieces of image data may be matched, and the order of the plurality of pieces of image data may be assessed based on an openness parameter indicating the degree of openness of the oral cavity.

Meanwhile, an image processing device according to the present disclosure may use the above-described image processing method so as to fit image data through an image data fitting unit and to apply a template the image data, thereby designing a smile line.

In addition, a plurality of pieces of image data having different degrees of openness may be received as an input, at least one of a size or an angle between the plurality of pieces of image data may be matched, and the plurality of pieces of image data may be arranged and displayed on a display based on an openness parameter indicating the degree of openness of the oral cavity.

The present disclosure is advantageous in that at least one of the size or angle of image data is fitted based on a feature point and a feature line on the image data, thereby improving the image data fitting accuracy, and simplifying the fitting computation.

In addition, there is an advantage in that, even if pieces of image data are not input in an order, the order in which the pieces of image data are arranged is automatically determined based on an openness parameter, and image data having a small degree of openness is overlaid onto image data having a large degree of openness such that the amount of the user's work is reduced, thereby improving user convenience, and a corrective treatment plan can be provided quickly.

In addition, there is an advantage in that the user may fit image data, virtually apply a corrective template desired by the patient or user, and thus easily predict the patent's smile line after correction.

BRIEF DESCRIPTION OF DRAWINGS

FIG. 1 is a flowchart of an image processing method according to the present disclosure.

FIG. 2 illustrates a diagram for explaining image data.

FIG. 4 illustrates a diagram for explaining fitting of image data based on a first feature line generated by connecting feature points.

FIG. 5 illustrates a diagram for explaining fitting of image data based on a second feature line generated by connecting feature points.

FIG. 6 illustrates a diagram for explaining a template applied to a feature region among fitted image data.

FIG. 7 illustrates normal face data among image data.

FIG. 8 illustrates open face data among image data.

FIG. 10 and FIG. 11 illustrate diagrams for explaining a third feature line and a fourth feature line generated by connecting feature points.

FIG. 12 illustrates a configuration of an image processing device according to the present disclosure.

BRIEF DESCRIPTION OF REFERENCE NUMERALS

Figure 3:
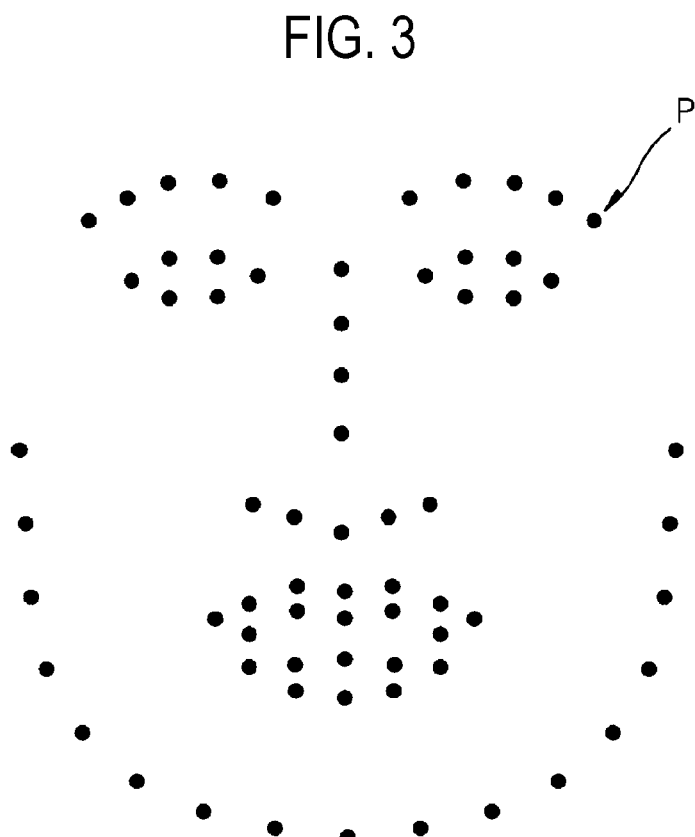
FIG. 3 illustrates a diagram for explaining feature points generated in image data.

S110: step of receiving image data as input
S120: step of assigning a feature point
S130: fitting step
S140: step of detemining an overlay order
S150: step of arranging pieces of image data
S160: designing step
10: image processing device     100: database
200: controller     300: display
400: face data     401: normal face data
402: open face data

DETAILED DESCRIPTION

Hereinafter, embodiments of the present disclosure will be described in detail with reference to exemplary drawings. It should be noted that, in connection with assigning reference numerals to components in respective drawings, identical components are given identical reference numerals, if possible, even if illustrated in different drawings. In addition, in the following description of embodiments of the present disclosure, detailed descriptions of relevant known configurations or functions will be omitted if deemed to obscure understanding of embodiments of the present disclosure.

In the following description of embodiments of the present disclosure, terms such as first, second, A, B, (a), and (b) may be used. Such terms are only for distinguishing a component from another component, and do not limit the nature, sequence, order, or the like of the corresponding component. In addition, unless defined otherwise, all terms used herein, including technical or scientific terms, have the same meanings as generally understood by those skilled in the art to which the present disclosure pertains. Terms defined in generally used dictionaries are to be interpreted as having the same meanings as those in the context of relevant technologies, and are not interpreted in ideal or excessive formal senses unless explicitly defined herein.

Figure 2:
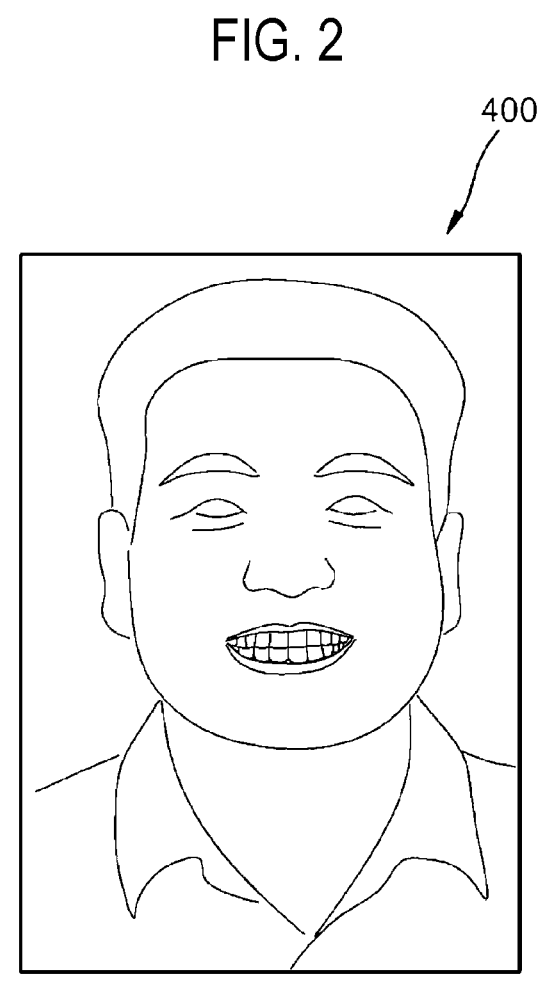

FIG. 1 is a flowchart of an image processing method according to the present disclosure. FIG. 2 illustrates a diagram for explaining image data. FIG. 3 illustrates a diagram for explaining feature points generated in image data.

Referring to FIG. 1 and FIG. 2, the image processing method according to the present disclosure may include a step (S110) of receiving at least one piece of image data as an input, a step (S120) of assigning a plurality of feature points onto the at least one piece of image data, a step (S130)

of fitting the at least one image data so as to have at least one of a predetermined size or a predetermined angle based on at least one feature line generated by connecting at least two feature points among the plurality of feature points, and a step (S160) of designing a smile line by applying at least one template to a predetermined region generated by feature points of the fitted image data.

In the present disclosure, a template refers to a corrected tooth sample model, and the template may have standard information of the a position, size, and shape regarding at least one tooth. A user and a patient may overlay the template onto the patient's tooth among image data so as to predict the shape of the tooth after correction. In addition, a plurality of templates may be provided to provide the patient with an optimal corrective object, and the user and the patient may selectively apply the plurality of templates to the patient's tooth among image data, thereby determining the template most appropriate for the patent's tooth.

Hereinafter, respective steps will be described in detail.

In the step (S110) of receiving at least one piece of image data as an input, the patient's image data that have already been captured may be received as an input. The image data is stored in a data storage element referred to as a database (DB), and may be input by the user's manipulation. The DB in which image data is stored may physically be a hard disk drive, a floppy disk drive, or a solid state drive, and may also be a cloud-type virtual database.

Preferably, the image data may be a person's face data. More specifically, the image data is face data 400 in which a person's eyes, nose, mouth, and the like are visible and in particular, may be face data in which a person's oral cavity is open, thereby exposing teeth. Face data 400 may be normal image data having a natural smile, and lifted oral commissures may partially expose teeth and gums. The partially exposed teeth and gums are included in a feature region described later, and a template for tooth correction may be virtually applied in the corresponding region.

Hereinafter, a process in which feature points are assigned on image data will be described.

Referring to FIG. 3, if image data is input, a step (S120) may be performed so as to assign a plurality of feature points on the input image data. In the step (S120) of assigning feature points, a plurality of feature points P may be assigned to characteristic portions on image data according to a predetermined standard based on face data. More specifically, the characteristic portions may be eyebrows, eye contours between upper and lower eyelids, the nose, lip outsides, lip insides, and the facial contour. The number of feature points P assigned in the step (S120) of assigning feature points may be determined such that characteristic portions of image data described above can be effectively represented.

For example, in the step (S120) of assigning feature points, an AI Facial Landmarks Detection scheme may be used to express characteristic portions of image data. It will be assumed in the following description that the present disclosure uses Face Landmark 68 algorithm in which 68 feature points P are assigned to the image data, among AI Facial Landmarks Detection schemes, but is not limited thereto, and any algorithm may be used as long as features of image data can be easily represented.

Meanwhile, when image data is input, if the image data that has been input is excessively rotated in one direction, feature points P may fail to be efficiently assigned to the image data. Therefore, in the step (S120) of assigning feature points, a plurality of feature points P may be assigned based on face data 400 while rotating the image data at a predetermined angle interval.

For example, in the step (S120) of assigning feature points, feature points P may be assigned while rotating image data clockwise or counterclockwise at an interval of 90°. As another example, in the step (S120) of assigning feature points, feature points P may be assigned while rotating image data clockwise or counterclockwise at an interval of 15°. There is an advantage in that, by assigning feature points P while rotating image data, it is possible to accurately recognize image data and to assign feature points P, and it is possible to determine a parameter in a normal position and to apply a template.

According to another embodiment, in the step (S120) of assigning feature points, artificial intelligence may be used to select image data most appropriate for face data 400 from a plurality of pieces of two-dimensional image data and continuous video data, and to assign feature points P to the selected image data. Step (S120) of assigning feature points by using artificial intelligence, if performed, is advantageous in that appropriate image data is automatically selected to assign feature points P, even if the user does not manually input image data most appropriate for the face data 400.

Hereinafter, the step (S130) of fitting image data based on the feature points assigned to the image data will be described in detail.

Figure 4:
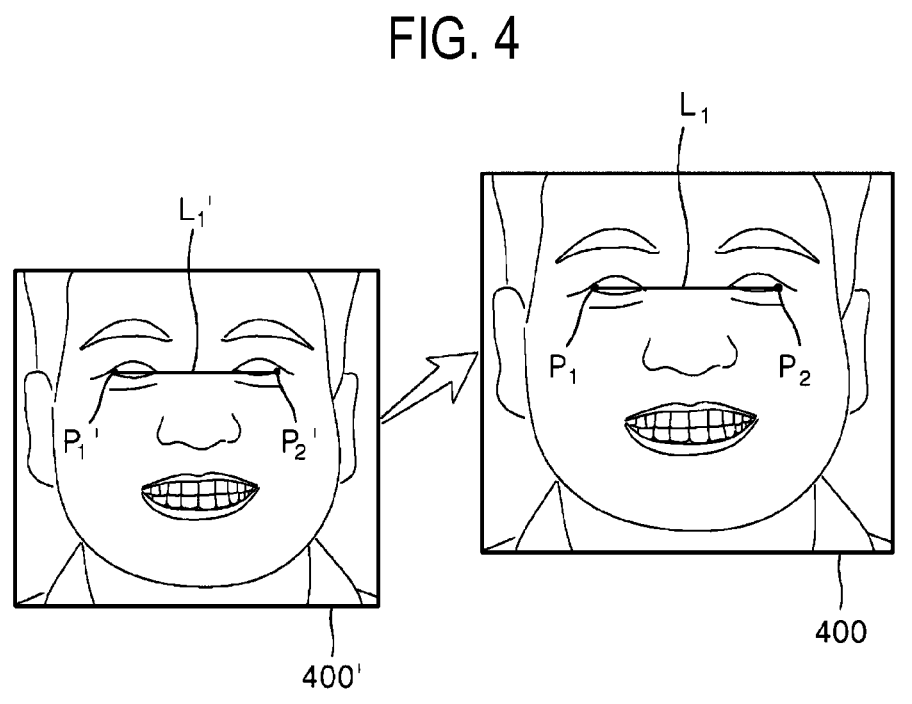
Figure 5:
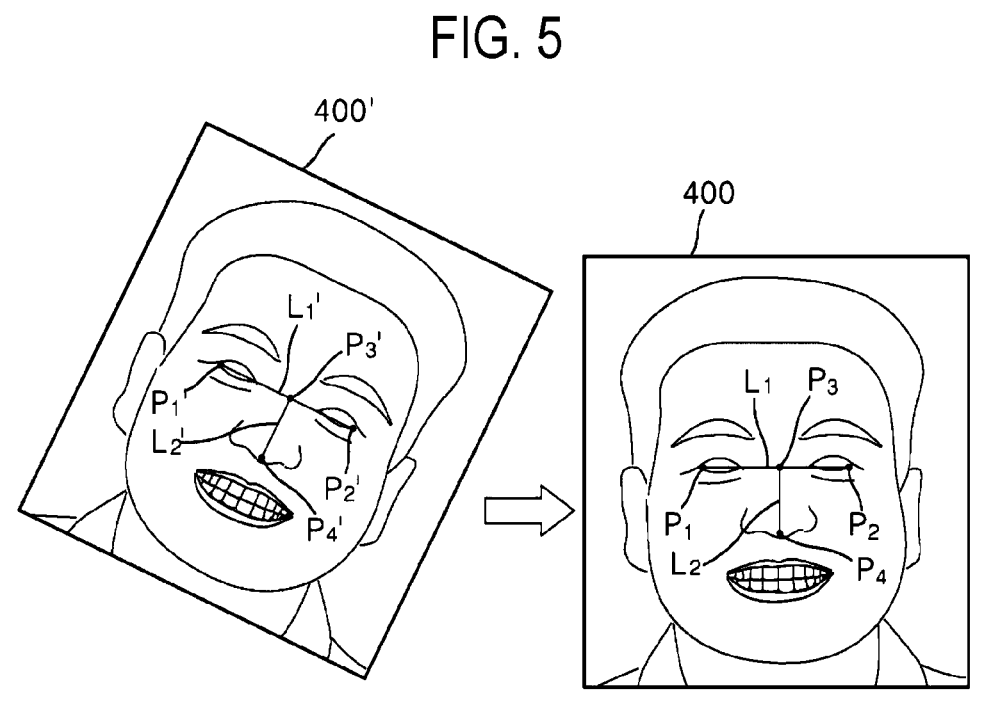

FIG. 4 illustrates a diagram for explaining fitting of image data based on a first feature line generated by connecting feature points. FIG. 5 illustrates a diagram for explaining fitting of image data based on a second feature line generated by connecting feature points.

Referring to FIG. 4 and FIG. 5, if feature points are assigned onto image data, step (S130) of fitting the image data so as to have at least one of a predetermined size or a predetermined angle based on the assigned feature points may be performed. That is, the position of feature points P, the distance between feature points P, and the angle between feature points P may be obtained, and these pieces of information may be used to perform the image processing method according to the present disclosure.

In the fitting step (S130), a predetermined feature line may be generated from the feature points P assigned in the above-described step (S120) of assigning feature points. For example, a feature line may be generated by connecting at least two feature points among the assigned feature points, and the generated feature line may be a line connecting feature points P1' and P2' corresponding to the lateral angle of respective eyes in the face data. This feature line is referred to as a first feature line L1' or an eyeline. Meanwhile, the feature points P1' and P2' may be the 37$^{th}$ feature point and the 46$^{th}$ feature point, respectively, but are not limited to these examples.

In the fitting step (S130), the size of image data may be expanded or reduced based on a generated feature line. More specifically, in the fitting step (S130), the size of image data may be expanded or reduced such that the length of a first feature line L1' conforms to a predetermined length. For example, if the length of the first feature line L1' is 300 pixels and a preset target length is 400 pixels, the size of image data may be expanded by multiplying the same by a predetermined value such that the length of a fitted first feature line L1 becomes 400 pixels. Meanwhile, if the length of the first feature line L1' is longer than the preset target length, the size of image data may be reduced by multiplying the same by a predetermined value such that the length of a fitted first feature line L1 becomes the preset target length.

In addition, in the fitting step (S130), image data may be rotated based on a generated feature line. In order to rotate image data, in the fitting step (S130), the image data may be rotated based on a second feature line L2' different from the first feature line L1'. More specifically, in the fitting step (S130), image data may be rotated by using a second feature line (or midline) L2' generated by connecting one point of the first feature line L1' and a feature point spaced apart from the first feature line L1'. The second feature line L2' may be generated by connecting the center point P3' of the first feature line L1' and a feature point P4'. For example, the feature point P4' may be feature point no. 34.

Based on the generated second feature line L2', in the fitting step (S130), image data is fitted such that a smile line is designated at a normal angle. For example, the angle of a fitted second feature line L2 may be perpendicular to the horizontal direction among a user interface (UI) plane on which image data is input and displayed.

By fitting face data 400' such that image data conforms to at least one of a predetermined size or a predetermined angle as described above, the user may apply a template accurately to the fitted face data 400 and may establish a highly reliable corrective plan.

Selectively, if the angle of image data has been fitted differently from the user's intent, the user may manually rotate the image data by a predetermined angle. For example, image data may be rotated clockwise or counterclockwise by using the center point P3 of a fitted first feature line L1 as a center of rotation, and the predetermined angle by which the image data may be rotated may be within about 5° clockwise or counterclockwise. By micro-rotating image data manually by a predetermined angle according to the user's assessment in this manner, the user may acquire image data fitted more appropriately for image data analysis and smile line design.

Figure 6:
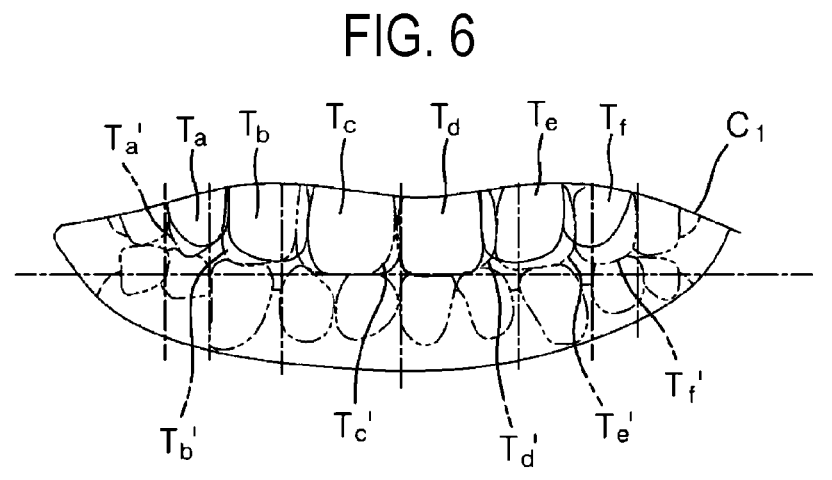

FIG. 6 illustrates a diagram for explaining a template applied to a feature region among fitted image data.

Referring to FIG. 6, after fitting of image data is completed, a step (S160) may be performed so as to apply at least one template to a predetermined region of the image data based on a feature point, thereby designing a smile line. The template may be corrected tooth data prestored in a database, and a plurality of templates may be provided such that an optimal template is applied to the patient's image data. The template may be customized by the user according to the patient's oral state. For example, the user may change the shape of teeth Ta, Tb, Tc, Td, Te, and Tf of the template. The shape of teeth may be changed by adjusting the tooth contour constituting teeth Ta, Tb, Tc, Td, Te, and Tf of the template. In addition, the user may change the position, size, color, or shading of teeth Ta, Tb, Tc, Td, Te, and Tf of the template. By changing the position or size of teeth Ta, Tb, Tc, Td, Te, and Tf of the template, the position or size of adjacent teeth may be changed in an interlinked manner. In addition, by changing the color or shading of teeth Ta, Tb, Tc, Td, Te, and Tf of the template, a comprehensive dental treatment plan may be considered in view of not only prosthodontics, but also whitening treatment. By customizing teeth Ta, Tb, Tc, Td, Te, and Tf of the template in this manner, the user may provide the patient with an optimal treatment plan.

Meanwhile, in the designing step (S160), a template may be applied to a feature region C1 generated by connecting at least three feature points among the plurality of feature points assigned in the feature point assigning step (S130). More specifically, a lipline generated by connecting feature points constituting lip insides, among the feature points assigned onto image data, may be formed into a feature region, and a template may be applied to tooth images Ta', Tb', Tc', Td', Te', and Tf existing in the feature region. More specifically, in the designing step (S160), a feature region C1 generated by connecting at least three feature points may be recognized as a lipline (lipline recognizing step), a tooth region having a tooth image appearing in the feature region C1 may be recognized (tooth image recognizing step), and a template may be matched with a tooth image in the feature region C1 constituting the lipline by using a template matching algorithm with regard to the tooth area (template matching step). According to the template matching algorithm, a template is matched in a tooth image position expressed in a feature region C1, and the algorithm may automatically match a template to a tooth area having an element similar to the template in view of an element such as a shape, size, or color. By applying a template to a feature region C1 in this manner, erroneous application of a template to a region other than a feature region C1 among image data may be prevented.

Meanwhile, an incorrect feature region may be generated if the position of feature points P is unclear when a feature region C1 is generated. In such a case, a function for correcting feature points formed on a user interface may be used to correct feature points P and the contour of a feature region C1, thereby performing more precise feature region C1 acquisition and template application processes.

The step (S160) of designing a smile line may be performed with regard to a single piece of image data, and the image data may be normal face data among the face data in which the oral cavity is open, thereby exposing teeth. A template may be applied in a feature region C1. The template may be displayed only inside the feature region C1, and the feature may be partially covered by a lipline in this case. The entire template may be displayed according to a need of the user, including parts existing outside the feature region C1.

In addition, in the step (S160) of designing a smile line, a single piece of normal face data may be replicated to form two pieces of identical image data (for example, first normal face data and second normal face data). In the case of the first normal face data, a template may be applied in a feature region C1, and in the case of the second normal face data, a template may be applied regardless of a feature region C1. More specifically, in the case of the first normal face data, a template is not displayed outside the lipline, and a part of the template may thus be covered by the lipline. In contrast, in the case of the second normal face data, the entire template may be displayed regardless of the lipline. Accordingly, through the first normal face data, the user and the patient may easily identify the smile line, and through the second normal face data, the dental technician may easily fabricate a corrective object. The corrective object may refer to an object worn by the patient. For example, the corrective object may refer to a prosthesis including a veneer and a laminate, a corrective device, and the like.

Meanwhile, a corrective object worn by a patient is fabricated by a dental technician working with a dentist. In this regard, there is a shortcoming in that a precise corrective object cannot be fabricated because the patent's lips cover some teeth with conventional patient image data including the patient's face. Therefore, in addition to conventional patient image data (for example, normal face data), image data including a face with the patient's mouth forcibly opened with a gag or the like has become necessary.

If two images are used as described above, according to the prior art, the user inputs image data of the patient with the oral cavity forcibly opened and conventional patient image data separately to an image processing device, and the different pieces of image data are manually aligned to perform smile design. Such an operation has a shortcoming in that the user needs to manipulate the image processing device through a large number of sessions, and user convenience is accordingly degraded, thereby delaying provision of a corrective treatment plan.

In order to provide a method for solving the above-mentioned shortcomings, additional steps for determining and arranging a plurality of pieces of image data will hereinafter be described in detail.

Figure 7:
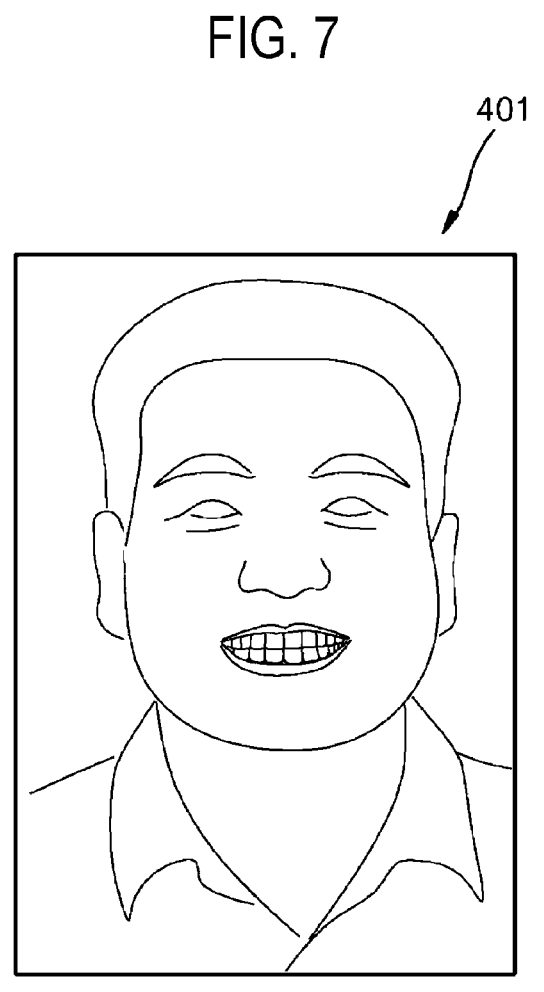
Figure 8:
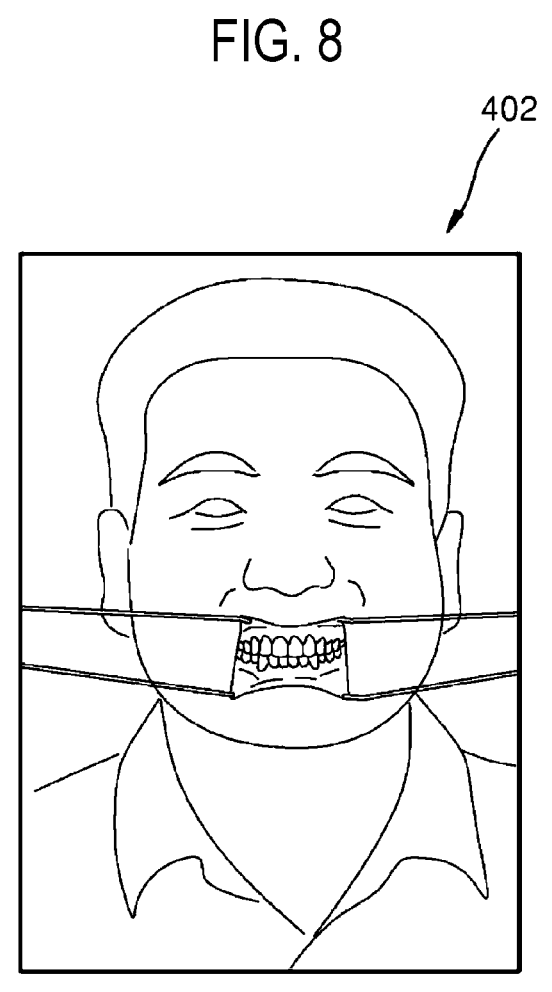
Figure 9:
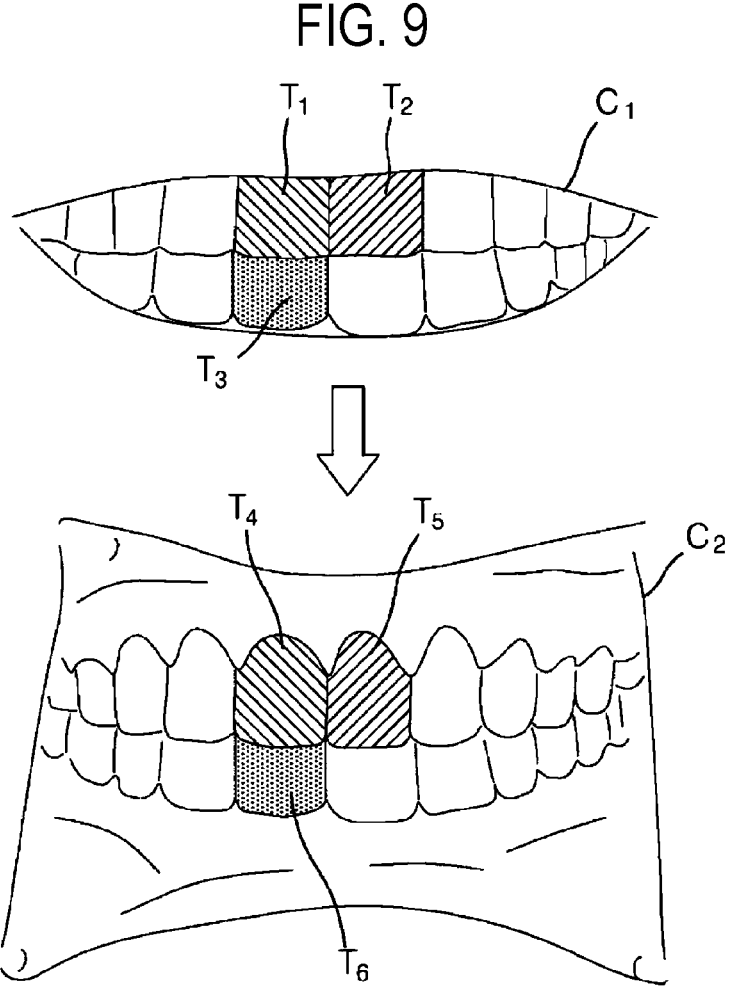
FIG. 9 illustrates diagram for explaining an example in which normal face data and open face data are matched.

FIG. 7 illustrates normal face 401 data among image data. FIG. 8 illustrates open face data 402 among image data. FIG. 9 illustrates an example in which the normal face data 401 and the open face data 402 are matched.

Referring to FIG. 7 and FIG. 8, in the image data receiving step (S110), a plurality of pieces of image data having different degrees of openness of the oral cavity may be received as an input. For example, in the image data receiving step (S110), two difference pieces of image data may be received. One of the pieces of image data may be the normal face data 401 having a smile line, and the other may be the open face data 402 having a larger degree of openness than the normal face data 401 because the oral cavity is forcibly opened with gag or the like. The normal face data 401 may be used by the user and the patient to apply a template such that a corrective plan is established, and the open face data 402 may be used by a dental technician to fabricate a corrective object.

Meanwhile, in the feature point assigning step (S120), feature points P may be assigned with regard to each piece of image data. That is, feature points P may be assigned to each of the normal face data 401 and the open face data 402, and the above-mentioned Face Landmark 68 algorithm may be used as a method for assigning the feature points P, but the method is not limited thereto.

After assigning the feature points P with regard to each piece of image data in the feature point assigning step (S120), at least one of the size or angle of pieces of image data may be matched with each other in the fitting step (S130) based on at least one feature line generated by connecting at least two feature points, among the feature points that the pieces of image data have.

For example, the size of the normal face data 401 may be matched so as to conform to the size of the open face data 402. Conversely, the size of the open face data 402 may be matched so as to conform to the size of the normal face data 401. In addition, the size of the normal face data 401 and the size of the open face data 402 may be matched so as to have an identical preset size. The process of matching the size of pieces of image data may be performed based on the length of a first feature line L1' as described above. There is an advantage in that, by matching the size of the normal face data 401 and the size of the open face data 402 to be identical, the overlay and comparative analysis of the normal face data 401 and the open face data 402 are facilitated, and alignment thereof is possible.

In addition, the angle of the normal face data 401 may be matched so as to conform to the angle of the open face data 402. Conversely, the angle of the open face data 402 may be matched so as to conform to the angle of the normal face data 401. In addition, the angle of the normal face data 401 and the angle the open face data 402 may be matched so as to have an identical preset angle. The process of matching the angle of pieces of image data may be performed based on the angle of a second feature line L2' as described above. There is an advantage in that, by matching the angle of the normal face data 401 and the angle of the open face data 402 to be identical, the overlay and comparative analysis of the normal face data 401 and the open face data 402 are facilitated, and alignment thereof is possible.

Meanwhile, when aligning the normal face data 401 and the open face data 402, the distance between both eyes of the actual person's face, and the distance and angle between a virtual line connecting both eyes and a predetermined point on the noise change insignificantly. That is, the normal face data 401 and the open face data 402 have a difference in the degree of openness of the mouth, but the distance between both eyes and the distance and angle between a virtual line connecting both eyes and the nose have constant values. Therefore, there is an advantage in that, by aligning the normal face data 401 and the open face data 402 through the distance of a first feature line L1' that represents a predetermined distance and the angle (and/or distance) of a second feature line L2' to a fourth feature point P4' spaced apart from the first feature line L1', the patient's face can be accurately aligned, and stable smile design is possible. Referring to FIG. 9, the fitting step (S130) may include a step of matching pieces of image data through feature regions C1 and C2. That is, in the fitting step (S130), pieces of image data may be matched through feature regions C1 and C2 generated based on feature points P assigned with regard to pieces of image data, respectively. The feature regions C1 and C2 may be lipline inside regions corresponding to regions inside lips among respective pieces of image data. More specifically, matching of pieces of image data through feature regions C1 and C2 may be performed through at least one of various schemes for expressing the feature regions C1 and C2. For example, in the fitting step (S130), regions inside the lipline may be recognized as feature regions C1 and C2, that is, regions having data regarding teeth T1, T2, T3, T4, T5, and T6 among the face data 401 and 402. Therefore, in the fitting step (S130), a feature region of one of pieces of received image data may be extracted, and the contour thereof may be compared with feature regions C1 and C2 of other image data, thereby performing matching. Such matching may be performed by using a template matching algorithm.

However, the element of feature regions for matching the normal face data 401 and the open face data 402 in the fitting step (S130) is not limited to the contour of feature regions (that is, the lipline contour), and matching between the plurality of pieces of image data may be performed by various elements inside feature regions, such as the color and shape of teeth. For example, in the fitting step (S130), the shape of predetermined teeth T1, T2, and T3 of the normal face data 401 and the shape of predetermined teeth T4, T5, and T6 of the open face data 402 may be compared so as to perform matching. Meanwhile, the number of matched teeth may vary, and not only the shape of teeth, but also other elements inside appropriate feature regions C1 and C2 may be used to perform matching.

In addition, the plurality of pieces of image data may be matched by using at least one of matching using feature lines L1' and L2' described above or matching using feature regions C1 and C2. For example, matching using feature lines L1' and L2' may be performed preferentially, and matching using feature regions C1 and C2 may be performed supplementarily. Using two or more matching schemes is advantageous in that the normal face data 401 and the open face data 402 can be aligned more precisely.

Hereinafter, processes of determining the order in which pieces of image data are to be arranged according to the degree of openness of the pieces of image data, and then arranging the pieces of image data according to the determined order will be described in detail.

Figure 10:
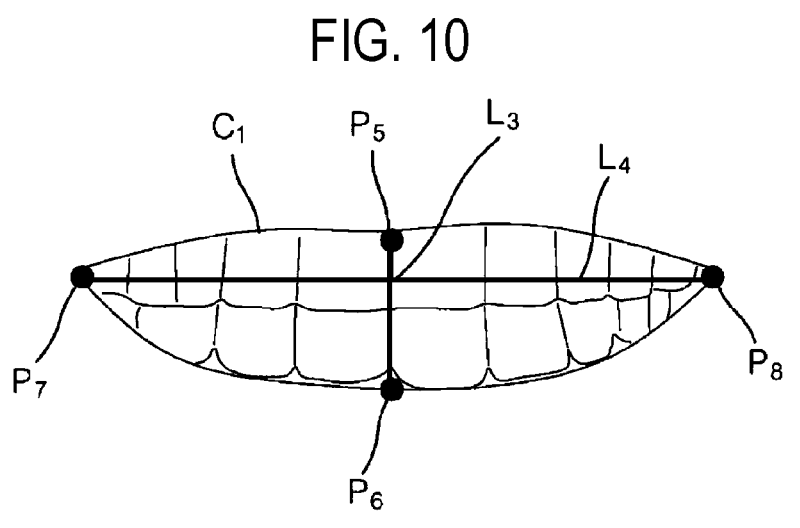
Figure 11:
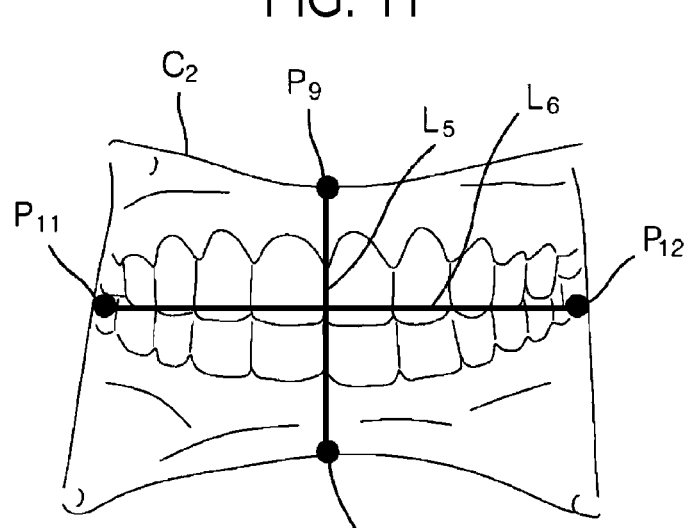

FIG. 10 and FIG. 11 illustrate diagram for explaining a third feature line and a fourth feature line generated by connecting feature points.

Referring to FIG. 10 and FIG. 11, the image processing method according to the present disclosure may include a step (S140) of determining the order in which pieces of image data are overlaid based on an openness parameter indicating the degree of openness of the oral cavity among pieces of face data, and a step (S150) of arranging the pieces of image data such that the pieces of image data are overlaid according to the order.

In the step (S140) of determining the overlay order, the order in which pieces of image data are displayed may be determined according to the degree of openness of the oral cavity among pieces of face data. More specifically, the normal face data 401 may be arranged with a higher rank than the open face data 402 such that a smile line designed through a template applied to the normal face data 401 is displayed to the user and the patient.

Various elements may exist as the openness parameter for determining the overlay order. Among them, openness parameters may be acquired by using the feature points assigned in the feature point assigning step (S120). For example, the openness parameter may be the length of third feature lines L3 or L5 generated by connecting at least two feature points among the feature points. More specifically, the third feature lines L3 or L5 may be straight lines connecting feature points P5 and P9 and feature points P6 and P10, respectively, and the third feature lines may represent the horizontal length of feature regions C1 and C2 which denote lip insides in respective pieces of the face data. For example, the feature points P5 and P9 may be feature point no. 63, and the feature points P6 and P10 may be feature point no. 67.

In addition, the third feature lines L3 and L5 may be formed to be spaced apart from the above-mentioned first feature line L1 and the second feature line L2. The third feature line L3 may be generated from respective pieces of image data, and in the overlay order determining step (S140), the length of the third feature line L3 of the normal face data 410 and the length of the third feature line L5 of the open face data 402 may be compared with each other. The open face data 402 is obtained while the oral cavity is forcibly opened, may have a feature region C2 vertically longer than the normal face data 401, and may be deemed to have a larger degree of openness than the normal face data 401. That is, the length of the third feature line L3 of the normal face data 401 may be shorter than the length of the third feature line L5 of the open face data 402.

In the overlay order determining step (S140), image data with relatively short third feature lines L3 and L5 may be determined to have a high rank. More specifically, since the length of the third feature line L3 of the normal face data 401 is shorter than the length of the third feature line L5 of the open face data 402, the normal face data 401 may be determined to be the first rank, and the open face data 402 may be determined to be the second rank. As used herein, "rank" may refer to an order in which images are displayed to the user and the patient through a display device, and images having high ranks may be displayed preferentially to the user and the patient.

Meanwhile, a predetermined ratio may be used as an openness parameter for determining the overlay order. In order to derive such a ratio, fourth feature lines L4 and L6 generated by connecting two new feature points P may be defined. The fourth feature lines L4 and L6 intersect with the third feature lines L3 and L5, respectively, and may be generated by connecting two different feature points P spaced apart from the third feature lines L3 and L5. More specifically, the fourth feature lines L4 and L6 may denote the horizontal length of feature areas C1 and C2. For example, the fourth feature lines L4 and L6 may be generated by connecting feature points P7 and P11 and feature points P8 and P12, respectively, among feature points P constituting the contour of feature regions C1 and C2. For example, the feature points P7 and P11 may be feature point no. 61, and the feature points P8 and P12 may be feature point no. 65.

The ratio used as an openness parameter may be the ratio of the length of third feature lines L3 and L5 to the length of fourth feature lines L4 and L6. Simply speaking, the ratio used as an openness parameter may refer to the ratio of the vertical length of a lipline against the horizontal length of the lipline in a feature region. By using such a ratio as an openness parameter, more precise determination is possible than when determining the overlay order of image data according to whether the length of the third feature lines L3 and L5 is long or short. In the overlay determining step (S140), the order of image data may be determined by comparing the ratios. That is, in the overlay determining step (S140), image data having a relatively small ratio may be determined to be a high rank. More specifically, since the ratio L3/L4 of the normal face data 401 is smaller than the ratio L5/L6 of the open face data 402, the normal face data 401 may be determined to be the first rank, and the open face data 402 may be determined to be the second rank.

After the overlay determining step (S140) is completed, image data arranging step (S150) may be performed such that image data determined to have a high rank is arranged to be overlaid onto the image data determined to have a low rank, according to the openness parameter used as the basis of determination. For example, if the length of the third feature lines L3 or L5 is used as the openness parameter, the image data with relatively short third feature lines L3 and L5 is determined to have a higher rank than the image data with relatively long third feature lines L3 and L5. As another example, image data having a small ratio of the third feature lines L3 and L5 to the fourth feature lines L4 and L6 may be deemed to have a higher rank than image data having a large ratio. In the image data arranging step (S150), a plurality of pieces of data are arranged according to the ranks such that image data deemed to have a high rank is successively overlaid on image data deemed to have a low rank. Accordingly, the normal face data 401 is automatically arranged to be overlaid onto the open face data 402, and the user and the patient may identify in advance the smile line after correction through the template applied to the normal face data 401. A dental technician may identify the template applied through the open face data 402 and may fabricate a corrective object conforming thereto.

Meanwhile, if an error occurs in connection with assigning feature points P or in connection with parameter-based determination, there is a possibility that the open face data 402 will be determined to have a higher rank than the normal face data 401 and then arranged accordingly. In such a case, the user may change the order of pieces of image data as desired by using an image switching function (not illustrated) formed on the user interface. Therefore, while the pieces of image data are automatically arranged, the order in which the pieces of image data are arranged may be switched if an error occurs such that the user can always be sure that the normal face data 401 is arranged to be overlaid onto the open face data 402, and thus can establish a corrective plan based on the normal face data 401.

At least a part of the above description may be displayed through an output device such as a display, and the user and the patient may easily identify the process in which the image processing method according to the present disclosure is performed. In addition, there is an advantage in that feature points, feature lines, feature regions, and templates on a user interface can be customized through an input device, and the user can provide the corrective object desired by the patient.

Hereinafter, an image processing device according to the present disclosure will be described in detail. In the following description of the image processing device, descriptions identical to those made in connection with the image processing method will be mentioned briefly or omitted.

FIG. 12 illustrates a configuration of an image processing device according to the present disclosure.

Referring to FIG. 12, the image processing device 10 according to the present disclosure may include a database 100 in which at least one piece of image data is stored, a controller 200 configured to receive the image data from the database and perform predetermined processing with regard to the image data, and a display 300 configured to visually display the result of processing performed by the controller 200.

Hereinafter, individual components will be described.

The database 100 may store image data. The image data may be face data in which the oral cavity is open, thereby exposing teeth. The description that the oral cavity is open may mean that the lips are open, thereby partially exposing teeth or gums, and may include normal face data having a natural smile line or open face data related to forced opening thereof. The database 100 may include not only the image data, but also an algorithm for generating feature points, at least one piece of tooth template data to be applied to the image data, and the like.

As described above in connection with the image processing method according to the present disclosure, the database 100 may be a physical storage device or a cloud.

Meanwhile, the controller 200 may receive the image data from the database 100 and may perform assignment of feature points to the image data, image fitting, smile line design, and the like. Detailed components of the controller 200 will now be described.

The controller 200 may include a feature point generating unit 210 configured to assign a plurality of feature points to the image data according to a predetermined standard, and an image data fitting unit 220 configured to fit the image data so as to have at least one of a predetermined size or a predetermined angle based on at least one feature line generated by connecting at least two feature points.

The feature point generating unit 210 assigns feature points to characteristic portions of the received image data. The characteristic portions may include, as described above, eyebrows, lower eyelids, upper eyelids, the nose, lip outsides, lip insides, and the facial contour. In order to represent the characteristic portions, feature points are assigned to the characteristic portions, and a plurality of feature points may be assigned to the image data. Feature points may be used as reference points when generating feature lines and feature regions (described later) and determining parameters. Meanwhile, the feature point generating unit 210 may use a predetermined standard in order to assign feature points to the image data, and the standard may be an algorithm such as face landmark 68.

The image data fitting unit 220 may fit the image data so as to have at least one of a predetermined size or a predetermined angle based on at least one feature line generated by connecting the feature points assigned by the feature point generating unit 210. For example, the image data fitting unit 220 may expand or reduce the size of the image data such that the length of a first feature line generated by connecting feature points generated at lateral angles of both eyes conforms to a predetermined length. In addition, the image data fitting unit 220 may rotate the image data such that a second feature line generated by one point of the first feature line and a feature point spaced apart from the first feature line has a predetermined angle. The image data fitting unit 220 may rotate the image data such that the angle of the second feature line is perpendicular to the horizontal direction among the user interface plane.

Hereinafter, a method for fitting image data received from the image data fitting unit 220 is as described above in connection with the image processing method.

After the image data fitting unit 220 completes fitting, the smile line design unit 260 may design the smile line of the fitted image data. The description that a smile line is designed may mean that at least one template is applied to a predetermined region generated by feature points among image data generated based on feature points. The predetermined region of image data may refer to a feature region generated by connecting at least three feature points among a plurality of feature points assigned by the feature point generating unit 210. For example, the feature region may be the inner region of a lipline generated by connecting feature points related to lip insides among image data. The feature region includes data indicating teeth, and the smile line design unit 260 may apply a template related to corrected teeth to the specific region so as to represent the patient's teeth state after correction.

Hereinafter, generation of feature points and image matching when there is a plurality of pieces of image data, and arrangement of the pieces of image data by a parameter generating unit 240 and a parameter determining unit 250 will be described.

The database 100 may have a plurality of pieces of image data stored therein, and the image data may include normal face data and open face data. The normal face data and the open face data may have different degrees of openness of the oral cavity. As described above, the normal face data may be used by the user and the patient to establish a corrective plan, and the open face data may be used by a dental technician to accurately identify a template design.

If a plurality of pieces of image data having different degrees of openness is input to the controller 200 from the database 100, the feature point generating unit 210 may assign feature points with regard to each piece of image data, and the image data fitting unit 220 may match at least one of the size or angle of the pieces of image data with each other based on at least one feature line generated by connecting at least two feature points among the feature points that the pieces of image data have. The description that pieces of image data are matched may mean that normal face data is matched to open face data, that open face data is matched to normal face data, or that the normal face data and the open face data are fitted to have at least one of a predetermined size or a predetermined angle.

In addition, the image data fitting unit 220 may match pieces of image data through feature regions generated in respective pieces of image data based on feature points generated by the feature point generating unit 210. The feature regions may be regions inside the lipline as described above, and a feature region of one of the pieces of received image data may be extracted, and a contour thereof may be compared with a feature region of different image data, thereby performing matching. Such a matching process may be performed by using a template matching algorithm as described above.

Meanwhile, the controller 200 may include a parameter generating unit 240 configured to generate an openness parameter indicating the degree of openness of the oral cavity among face data, and a parameter determining unit 250 configured to determine an overlay order between pieces of image data based on the openness parameter generated by the parameter generating unit 240.

The parameter generating unit 240 may generate a parameter based on feature points assigned by the feature point generating unit 210. For example, the openness parameter may be a length of a third feature line generated by connecting at least two feature points among the feature points. The length of the third feature line may indicate a vertical length of the lipline which is a feature region. In addition, the openness parameter may be a ratio of the length of the third feature line to the length of the fourth feature line. In this case, the third feature line may be generated by connecting at least two feature points among the feature points, and the fourth feature line may intersect with the third feature line and may be generated by connecting two different feature points which are spaced apart from the third feature line, among the feature points. The length of the fourth feature line may indicate a horizontal length of the lipline which is a feature region.

If the generated openness parameter is the length of the third feature line, the parameter determining unit 250 may determine the image data of the third feature line having a relatively short length to be a high rank. In addition, if the generated openness parameter is the ratio of the third feature line to the fourth feature line, the parameter determining unit 250 may determine the image data having a relatively small ratio to be a high rank. The detailed process in which the overlay order is determined based on the openness parameter of image data is as described above in connection with the image processing method according to the present disclosure.

Meanwhile, the controller 200 may further include an image data arranging unit 230 configured to arrange pieces of image data such that the pieces of the image data are overlaid in an order determined by the parameter determining unit 250. The image data arranging unit 230 may arrange the image data deemed to have a high rank according to the length of the third feature line or the ratio of the third feature line against the fourth feature line as described above, so as to be overlaid onto image data determined to have a low rank. Since the length of the third feature line of the normal face data is shorter than the length of the third feature line of the open face data, the normal face data may be determined to have a higher rank than the open face data and may be arranged to be overlaid onto the open face data. In addition, since the ratio of the length of the third feature line to the fourth feature line of the normal face data is smaller than the ratio of the open face data, the normal face data may be determined to have a higher rank than the open face data and may be arranged to be overlaid onto the open face data.

According to the above descriptions, the present disclosure is advantageous in that feature points are assigned to image data, which is fitted with a predetermined size and a predetermined angle, and a template is then applied such that a corrective plan may be established through image data having a constant specification.

In addition, there is an advantage in that, by applying a template to the face data, the patient's smile line after correction may be identified in advance.

In addition, there is an advantage in that, when normal face data and open face data are received as an input, the order in which the pieces of image data are arranged is determined based on an openness parameter derived from respective pieces of image data regardless of the order of input, thereby automatically providing the desired image data arrangement order.

In addition, there is an advantage in that, by automatically having the desired image data arrangement order, the user may minimize manipulations for arranging pieces of image data.

In addition, there is an advantage in that, by changing the shape, color, or the like of the template as needed, the user may provide a patient with an optimal corrective object.

Although the technical spirit of the present disclosure has been described by the examples, various modifications and changes can be made without departing from the scope of the present disclosure which can be understood by those skilled in the art to which the present disclosure pertains.

Therefore, embodiments disclosed in the present disclosure are not intended to limit but describe the technical spirit of the present disclosure, and the scope of the technical concept of the present disclosure is not limited by the embodiments. The scope of protection of the present disclosure is to be interpreted by the appended claims, and all technical concept falling within equivalent scopes are to be interpreted as falling within the claimed scope of the present disclosure.

INDUSTRIAL APPLICABILITY

The present disclosure provides an image processing method and a device using the same, wherein pieces of image data representing a patient's face are matched, and a template conforming to the patient is applied such that the patient and a practitioner can easily identify a smile line, and a dental technician can easily fabricate a corrective object.

What is claimed is:

1. An image processing method comprising:
receiving a plurality of pieces of image data having different degrees of openness of an oral cavity as an input;
assigning a plurality of feature points onto the plurality of pieces of image data, respectively;
fitting the plurality of pieces of image data such that at least one of a size or an angle of the plurality of pieces of image data is matched with each other based on at least one feature line generated by connecting at least two feature points among the plurality of feature points which the plurality of pieces of image data have;
designing a smile line by applying at least one template to a feature region generated by the plurality of feature points among the plurality of pieces of fitted image data,
determining an overlay order among the plurality of pieces of image data based on an openness parameter indicating a degree of openness of the oral cavity; and
arranging the plurality of pieces of image data such that the plurality of pieces of image data are overlaid according to the overlay order.

2. The image processing method of claim 1, wherein the fitting comprises matching the plurality of pieces of image data through the feature region generated for each of the plurality of pieces of image data.

3. The image processing method of claim 1, wherein the openness parameter is a length of a third feature line indicating a vertical length of the feature region, and
wherein, in the determining of the overlay order, image data having a short third feature line length is determined to have a high rank.

4. The image processing method of claim 3, wherein, in the arranging of the plurality of pieces of image data, image data determined to have a high rank is arranged to be overlaid on image data determined to have a low rank according to the length of the third feature line or the ratio of the length of the third feature line to the length of a fourth feature line.

5. The image processing method of claim 1, wherein the openness parameter is a ratio of a length of a third feature line to a length of a fourth feature line,
wherein the third feature line indicates a vertical length of the feature region,
wherein the fourth feature line intersects with the third feature line and indicates a horizontal length of the feature region, and
wherein in the determining of the overlay order, image data having a small ratio of a length of the third feature line to a length of the fourth feature line is determined to have a high rank.

6. An image processing device comprising:
a database configured to store at least one piece of image data, the at least one image data being face data in which an oral cavity is open so as to expose teeth and a plurality of pieces of image data having different degrees of openness of the oral cavity;
a controller; and
a display configured to visually display a performing result of the controller,
wherein the controller is configured to:
receive the at least one piece of image data from the database as an input and assign a plurality of feature points onto the at least one piece of image data;
fit the at least one piece of image data so as to have at least one of a predetermined size or a predetermined angle based on at least one feature line generated by connecting at least two feature points among the plurality of feature points;
design a smile line by applying at least one template to a feature region generated by the plurality of feature points of the at least one piece of image data,
assign the plurality of feature points onto the plurality of pieces of image data, respectively;
match at least one of a size or an angle of the plurality of pieces of image data with each other based on at least one feature line generated by connecting at least two feature points among the plurality of feature points which the plurality of pieces of image data have;
determine an overlay order among the plurality of pieces of image data based on the openness parameter; and
arrange the plurality of pieces of image data such that the plurality of pieces of image data are overlaid according to the overlay order.

7. The image processing device of claim 6, wherein the controller is configured to perform at least one of the following two steps:
expanding or reducing a size of the at least one piece of image data such that a length of a first feature line generated by connecting at least two feature points conforms to a predetermined length; and rotating the at least one piece of image data such that an angle of a second feature line generated by connecting one point of the first feature line and a feature point spaced apart from the first feature line conforms to a predetermined angle.

8. The image processing device of claim 6, wherein the feature region is a lip line including a tooth image.

9. The image processing device of claim 6, wherein the controller is configured to match the plurality of pieces of image data through the feature region generated for each of the plurality of pieces of image data.

10. The image processing device of claim 6, wherein the openness parameter is a length of a third feature line indicating a vertical length of the feature region, and wherein the controller is configured to determine image data having a short third feature line length to have a high rank.

11. The image processing device of claim 10, wherein the controller is configured to arrange image data deemed to have a high rank to be overlaid on image data deemed to have a low rank according to the length of the third feature line or the ratio of the length of the third feature line against the length of a fourth feature line.

12. The image processing device of claim 6, wherein the openness parameter is a ratio of a length of a third feature line to a length of a fourth feature line, wherein the third feature line indicates a vertical length of the feature region, wherein the fourth feature line intersects with the third feature line and indicates a horizontal length of the feature region, and wherein the controller is configured to determine image data having a small ratio of a length of the third feature line to a length of the fourth feature line to have a high rank.

* * * * *